W. LACY.
COOKING-UTENSIL.
No. 171,231. Patented Dec. 21, 1875.
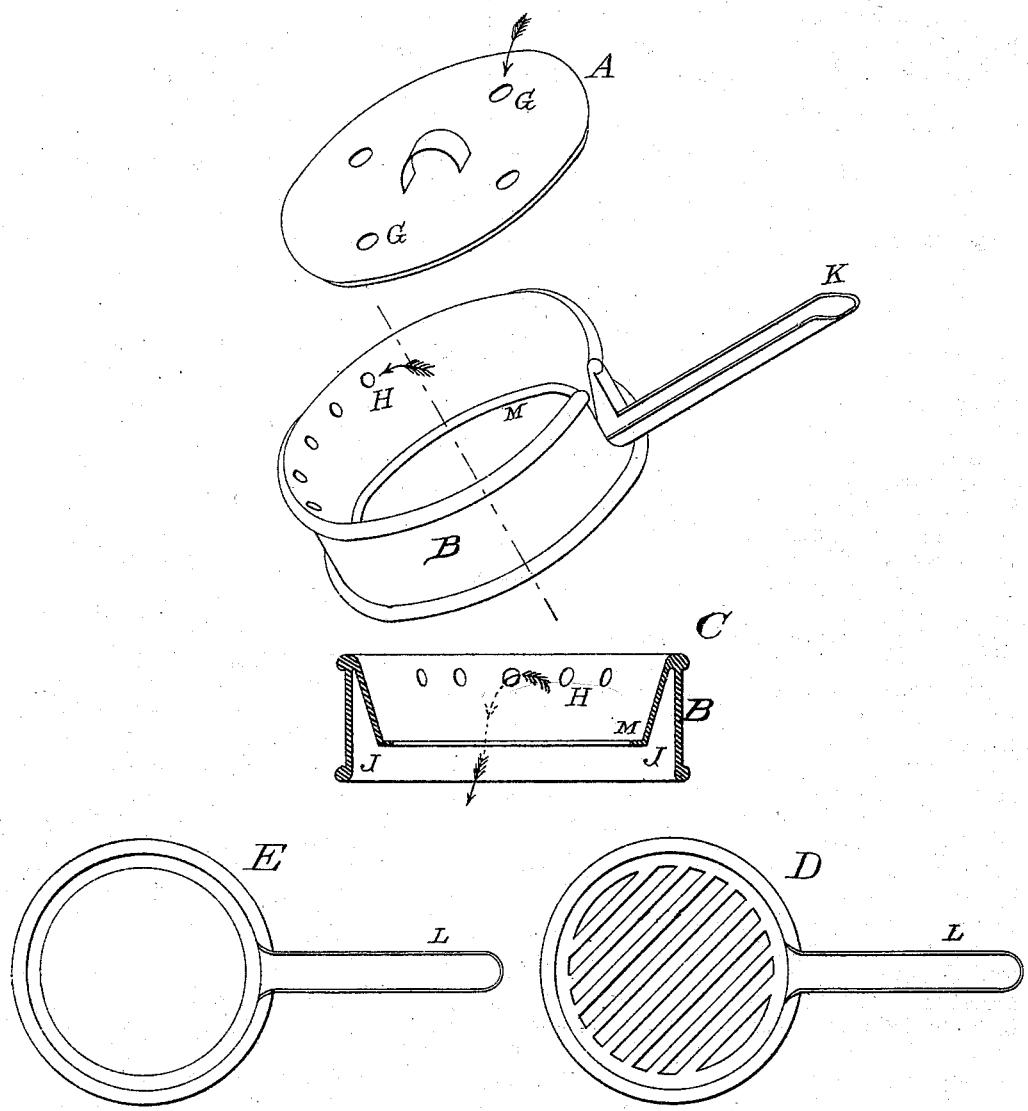

UNITED STATES PATENT OFFICE.

WALTER LACY, OF MILWAUKEE, WISCONSIN.

IMPROVEMENT IN COOKING UTENSILS.

Specification forming part of Letters Patent No. 171,231, dated December 21, 1875; application filed November 23, 1874.

*To all whom it may concern:*

Be it known that I, WALTER LACY, of the city of Milwaukee, in the county of Milwaukee and State of Wisconsin, have invented certain new and useful Improvements in Stove Furniture or Cooking Utensils; and I do hereby declare the following to be a full, clear, and exact description of the invention, such as will enable others skilled in the art to which it pertains to make and use it, reference being had to the accompanying drawings, which form part of this specification.

The object of my invention is to make improved culinary vessels of the description generally known as stove furniture, which shall cause all the steam and odor produced in cooking to pass into the stove or range, and thence upward through the flue instead of into the room, whereby all disagreeable odor caused in cooking is entirely avoided.

My invention is not new in the end sought, but provides a new, more convenient, and cheaper method of attaining that end.

In the accompanying drawing, B is a double-walled annular bottomless shell, usually cylindrical in shape, and of a size suitable to fit into the griddle-hole of the stove or range. If desired, it may stand over the griddle-hole. Its double walls are constructed as shown in C. J J represent the outer wall, and M represent the inner one, which is provided with a rim, as shown on the inside lower edge. A is a cover to the shell B, and has in it several perforations, as G G. K is the handle of the shell, and is fastened to it at the lower end of a slot or notch cut in the shell, usually about two-thirds of the distance from the top to the bottom. H represents a row of small holes through the inner wall of the shell, near its upper edge, and leading into the hollow space between its two walls. D is a broiler and gridiron, consisting of a rim, bars, and the handle L, as shown. E is a stew-pan, having either straight or flaring sides, and provided with a rim on its outer side, at the top, and having a handle, L.

The operation of my improved cooking utensils is as follows: The bottomless shell B being placed in or over the griddle-hole of the stove, the sauce-pan E, for instance, is placed within it, the upper exterior rim of the stew-pan resting upon the lower interior rim of the inner wall of the shell M, and fitting closely to it. This is permitted because the handle L of the stew-pan E passes down through the notch in the upper edge of the shell, and rests on the upper side of the handle K of the shell.

The handle K is concave on its upper side, so as to receive L, which is convex on its lower side, just fitting it.

The lid being placed upon the top of the shell, and the water and things to be cooked being placed within the stew-pan, the steam rises, and, conveying with it the scent of the edibles cooking, passes through the holes H into the annular space between the walls of the shell, and thence downward into the stove, and passes off with the products of combustion. Its passage is assisted by means of the draft created by the rush of outer air through the holes in the lid and the notch for the reception of the handle. The stew-pan being removed, the broiler (shown in the drawing) can be used in the same way; and other and deeper vessels, also of any suitable size and construction, can be used with the shell, forming, in separate connection with the described shell, an entire set of anti-steam and odorless stove furniture. In the kettle or stew-pan may be placed a steamer, of the form and construction of those now in common use, the surplus steam being carried into the stove instead of into the room.

I have named but a few of the vessels which can be thus used with this steamless shell. Even tea and coffee pots can be adapted to be placed within the shell by simply making them of proper size, and with a rim to support them upon the inner lower rim of the described shell. A spider can be used thus.

I am fully aware that cooking utensils have heretofore been patented and manufactured which possessed double walls, and operated in a manner similar to that described; but they required double walls in each separate utensil, while my invention consists of a double-walled bottomless shell, and provides for the use of one double-walled bottomless shell (or shell provided with the described passage-way) in conjunction with any one of an indefinite number of vessels of ordinary construction adapted to fit the shell. These separate vessels, to be used in connection with the one double-walled shell, form, with the shell itself, a complete set of stove furniture, equally convenient as and far cheaper than the same number of vessels, each complete in itself, with double walls would be.

I therefore claim as my invention—

A cooking utensil consisting of a double-walled annular bottomless shell, B, provided with a perforated cover, A, and with a handle, K, placed at the lower edge of a slot or notch cut in the upper edge of shell B, and also provided with the perforations H and lower interior rim M, substantially as hereinbefore set forth, and for the purposes mentioned.

In testimony that I claim the foregoing I have hereunto set my hand and seal this 2d day of November, 1874.

WALTER LACY. [L. S.]

Witnesses:
DE FOREST CRANDALL,
JOHN F. BRUCE.